Aug. 26, 1952     A. P. RITTER     2,608,206
LIQUID LEVEL CONTROLLING DEVICE
Filed Sept. 7, 1948     2 SHEETS—SHEET 1
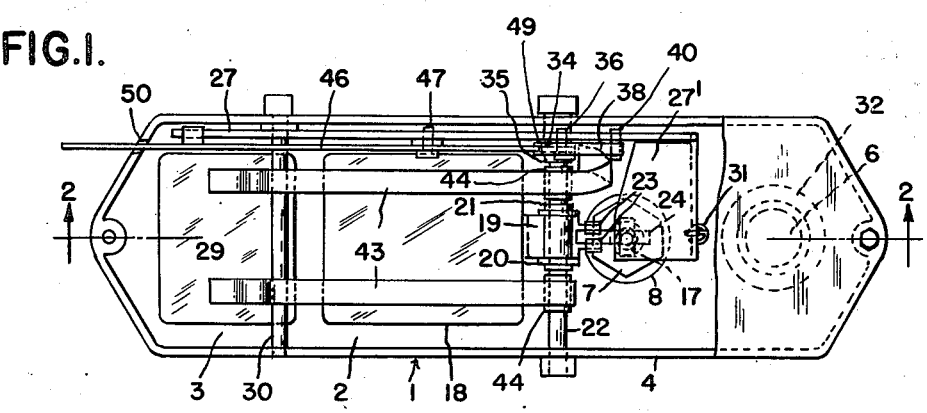
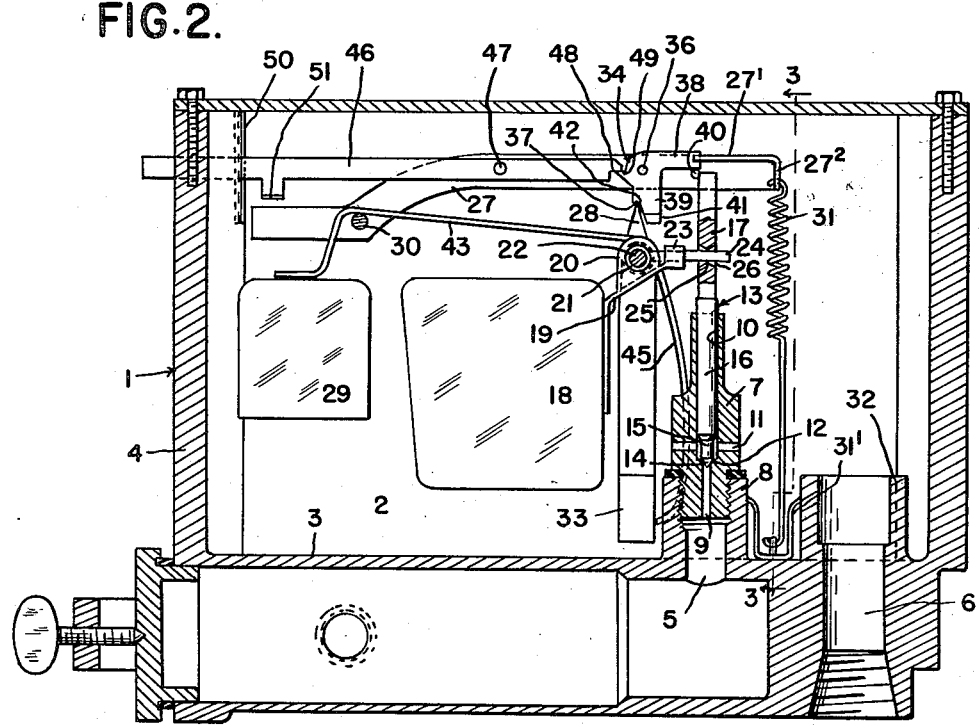
*INVENTOR.*
ANDREW P. RITTER
BY
ATTORNEYS Aug. 26, 1952    A. P. RITTER    2,608,206
LIQUID LEVEL CONTROLLING DEVICE
Filed Sept. 7, 1948    2 SHEETS—SHEET 2
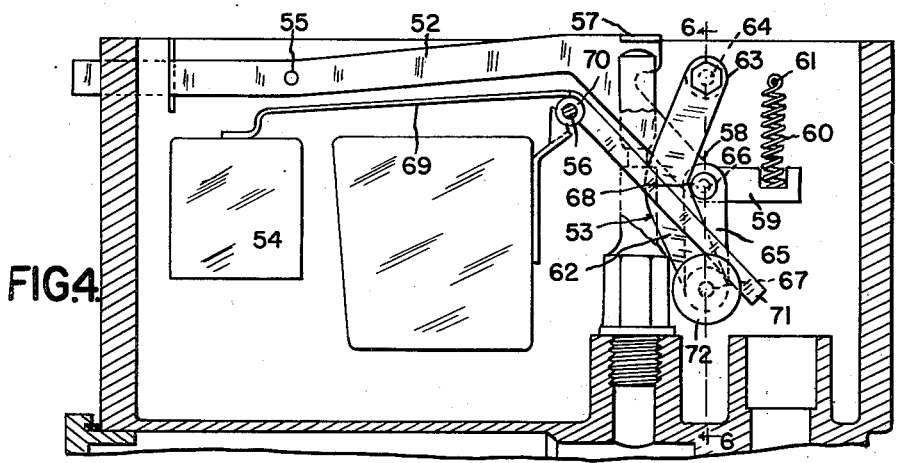
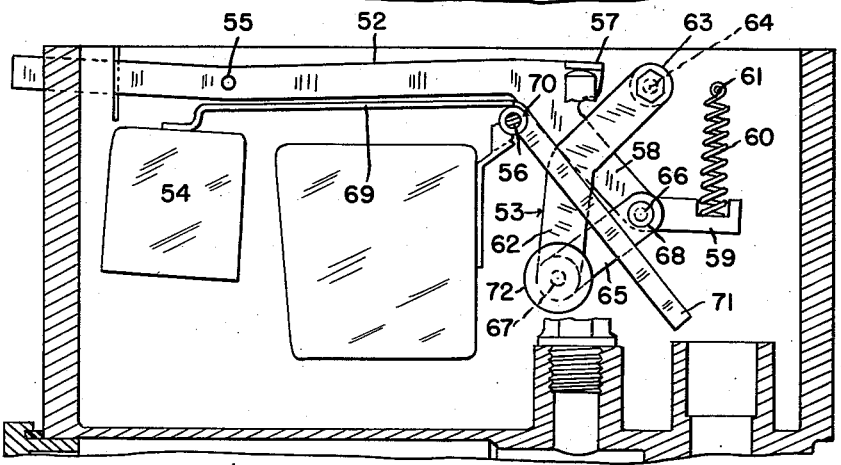
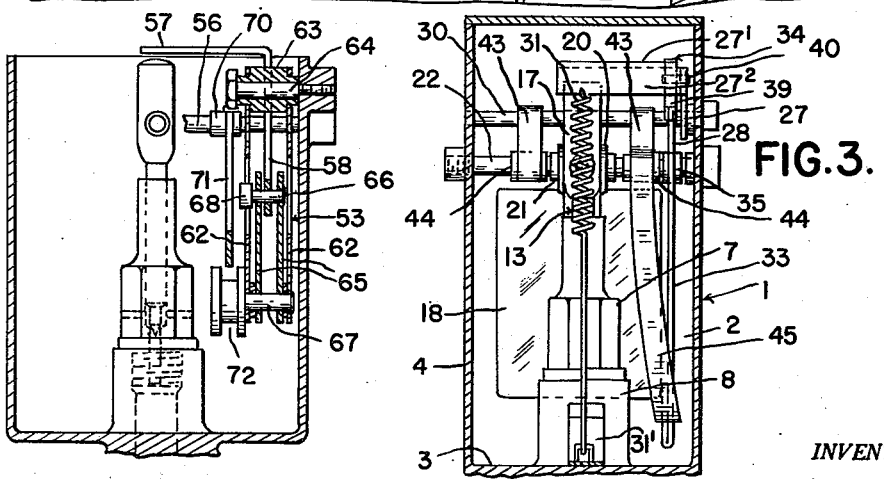
INVENTOR.
ANDREW P. RITTER
BY
*Whittemore Hulbert Belknap*
ATTORNEYS Patented Aug. 26, 1952

2,608,206

UNITED STATES PATENT OFFICE 2,608,206

LIQUID LEVEL CONTROLLING DEVICE

Andrew P. Ritter, Lansing, Mich., assignor to Piatt Products Corporation, Lansing, Mich., a corporation of Michigan Application September 7, 1948, Serial No. 48,017

9 Claims. (Cl. 137—400)

The invention relates to liquid level controlling devices and refers more particularly to devices for controlling the level of oil being fed by gravity to oil burners.

The invention has for one of its objects to provide a simple compact construction of liquid level controlling device which insures the closing of the inlet valve to the liquid chamber in the event of failure of the means for normally effecting the closing of the inlet valve when a predetermined normal height of liquid in the chamber is reached.

The invention has for another object to provide an improved construction of liquid level controlling device employing both a main float and a safety float in the same chamber; to provide an improved construction of liquid level controlling device in which the safety means for effecting the closing of the valve may be readily reset; to provide an improved construction of liquid level controlling device in which the floats are journalled on the same pivot pin; and to provide an improved construction of liquid level controlling device in which the means for normally closing the inlet valve serves also to hold the valve from turning about its axis.

With these as well as other objects in view, the invention resides in the novel features of construction and combinations and arrangements of parts as more fully hereinafter set forth:

In the drawings:

Figure 1 is a plan view of the liquid level controlling device with the cover removed.

Fig. 2 is a cross section on the line 2—2 of Figure 1.

Figure 3 is a cross section on the line 3—3 of Figure 2.

Figure 4 is a view similar to Figure 2 showing a modified construction.

Figure 5 is a view similar to Figure 4 showing the parts in position after operation of the safety float.

Figure 6 is a cross section on the line 6—6 of Figure 4.

The liquid level controlling device as shown in Figures 1, 2 and 3 has the casing 1 provided with the chamber or reservoir 2 formed by the bottom and side walls 3 and 4 respectively and also provided with the inlet and outlet ports 5 and 6 respectively which extend through the bottom wall. For placing the inlet port in communication with the chamber there is the inlet member 7 threaded into the tubular boss 8 and extending upwardly within the chamber, the boss being integral with the bottom wall 3. The inlet member has the axial passage 9, the enlarged axial passage 10 and the radial passages 11 opening into the lower end portion of the enlarged axial passage above the upwardly facing annular shoulder 12 between the axial passages and forming a valve seat. The enlarged axial passage 10 slidably receives and guides the valve 13 which is formed with the tapered or conical lower end 14 adapted to engage the valve seat, the adjoining cylindrical portion 15 of smaller diameter than the enlarged axial passage 10 and the cylindrical portion 16 extending upwardly from the cylindrical portion 15 and of a diameter to slidably engage the enlarged axial passage 10. The valve also has the portion 17 extending upwardly from the cylindrical portion 16 above the inlet member 7, the portion 17 being of polygonal cross-section and more particularly rectangular cross-section.

For normally maintaining a substantially constant level of liquid in the chamber 2, there is the main float 18 within the chamber and operatively connected to the valve 13. The main float has the lever 19 secured thereto and this lever has the spaced upwardly extending ears 20 sleeved over the bushing 21 which is journalled on the pivot pin 22. The pivot pin extends between and is mounted in opposite side walls of the casing. The lever also has the arcuate ears 23 which are bent around the opposite sides of the cylindrical rod 24 and secure this rod to the lever. The rod extends through the rectangular portion 17 of the valve having an opening formed with the portion 25 midway between its ends of a size to slidably receive the rod and with the end portions 26 flared in opposite directions from the midway portion. As a result the valve is held from rotation about its axis.

To assure closing of the valve 13 in the event of failure of the main float 18 to close the valve when a predetermined normal level of liquid in the chamber 2 has been reached, safety mechanism is provided comprising the impact member 27, the latching device 28 for normally holding the impact member in inoperative position and the safety float 29 for releasing the latching device when the level of the liquid in the chamber 2 reaches a predetermined abnormal height above the normal level as controlled by the main float 18.

The impact member 27 is a lever in the nature of a bar mounted near one end on the pivot pin 30 which extends substantially parallel to the pivot pin 22 and is mounted in opposite side walls of the casing. The other end of the impact lever 27 has the contact portion 27' for contact with the upper end of the valve 13 and more particularly the rectangular portion 17 of the valve, the contact portion in the inoperative position of the impact lever being spaced above the valve. For normally urging the lever to operative position to move its contact portion against the valve and move the latter to closed position, there is the coil spring 31 connected to the transverse terminal portion 27² of the impact lever and the spring clip 31' which latter is insertable between the tubular inlet boss 8 and the tubular outlet boss 32. In the present instance the contact portion 27' is a horizontal flange integral with and at the upper edge of the transverse terminal portion 27² and preferably welded to the main portion of the impact lever.

The latching device 28 is an over-center latching device comprising the pendulum lever 33 and the pivotal latch 34, the pendulum lever being secured to the bushing 35 journaled on the pivot pin 22 and the latch being mounted on the pivot pin 36 above the pivot pin 22 and carried by the impact lever 27. The pendulum lever has a V-shaped upper end above the pivot pin 22 providing at its apex the bearing surface 37. The latch 34 is generally L-shaped and has the transverse arms 38 and 39, the latter arm being heavier and in the normal position of the latch depending below the pivot pin 36 and the former arm extending horizontally in the normal position of the latch and resting on the stop pin 40 secured to the impact lever 27. The arm 39 has the lower end portion 41 which in the normal position of the latch overlaps the upper end portion of the pendulum lever and the arm 39 also has above its lower end portion a lateral shoulder providing the bearing surface 42 for engaging the bearing surface 37 of the pendulum lever in the normal position of the latch and the latching position of the latching device. The bearing surfaces 37 and 42 in the latching position of the latching device are offset from the line connecting the axes of the pivot pins 22 and 36 in a direction to hold the latching device in latching position until either the pendulum lever or the latch is swung to move the interengaging bearing surfaces to the other side of the line connecting the pivot pins. The lower end portion 41 of the latch is at the opposite side of the line connecting the axes of the pivot pins 22 and 36.

The safety float 29 for releasing the latching device in the event that the level of the liquid in the chamber 2 reaches a predetermined abnormal height is located within the chamber and has secured thereto the levers 43 which are secured to the bushings 44 journalled on the pivot pin 22 at opposite ends of the bushing 21. The lever 43 adjacent the impact lever 27 is formed with the depending portion 45 having its lower end positioned to abut the pendulum lever 33 when the safety float 29 rises and thereby swing this pendulum lever to move the interengaging bearing surfaces 37 and 42 over center and release the latching mechanism after which the coil spring 31 forcibly swings the impact lever 27 from its inoperative position to hit the upper end of the valve and move the valve to closed position. To position the safety float 29 in the chamber 2 the levers 43 extend over the pivot pin 30 and normally rest thereon to normally support the safety float.

To manually swing the latch 34 and release the latching device 28, I have provided the lever 46 pivotally mounted at 47 upon the impact lever 27 and having at one end the shoulder 48 for engaging the shoulder 49 formed at the same edge of the arm 39 as the bearing surface 42. The other end of this lever 46 extends through the slot 50 in a side wall of the casing to be operable from outside the casing, it being apparent that when the exposed outer end of this lever is raised its shoulder 48 acting upon the shoulder 49 of the latch 34 will swing the interengaging bearing surfaces of the latch and pendulum over-center to move the latching device to releasing position and allow the coil spring 31 to act through the impact lever to move the valve to closed position.

For the purpose of resetting the latching device, the lever 46 is provided with the transverse shoulder 51 above and normally spaced from the outer end of the impact lever 27 and adapted upon lowering of the lever 46 to swing the impact lever to a position above its inoperative position against the resistance of the coil spring 31 at which time the latch 34 will resume its operative position to engage its bearing surface 42 with the bearing surface 37 of the pendulum lever 33 when the coil spring 31 is allowed to move the impact lever 27 to operative position. As a result, the latching device will hold the impact lever in its inoperative position.

The liquid level controlling device illustrated in Figures 4, 5 and 6 has the same construction of casing, inlet member, liquid controlling valve, main float and operative connections between the main float and valve as shown in Figures 1, 2 and 3.

The mechanism for assuring closing of the valve upon failure of the main float to move the valve to closed position differs and comprises in general the impact member 52, the over-center latching device 53 and the safety float 54.

The impact member 52 is a lever mounted upon the pivot pin 55 which extends parallel to the pivot pin 56 for the main float and between opposite side walls of the casing. One end portion of the impact lever extends through a slot in the casing side wall and is exposed to be manually operated from outside the casing. The other end portion of the impact lever is provided with the transverse flange 57 and with the downwardly inclined arm 58. The contact flange is spaced above the valve in the normal position of the impact lever and is in position to engage the upper end of the valve when the impact lever is released. The arm 58 is formed at its lower end with the horizontally extending end portion 59 abutted by the lower end of the coil spring 60 having its upper end secured to the pin 61 mounted in the casing, the coil spring being under compression and normally urging the arm 58 and contact flange 57 downwardly.

The latching device 53 comprises the pendulum levers 62 mounted at their upper ends on the bushing 63 journalled on the pivot pin 64 secured to a side wall of the casing. The latching device also comprises the bifurcated link 65 pivotally connected at the upper ends of its furcations to the arm 58 by the pivot pin 66 and pivotally connected at the lower ends of its furcations to the lower ends of the pendulum levers by the pivot pin 67 vertically below the pivot pin 64 in the normal position of the latching device. The pendulum levers 62 are V-shaped in contour so that in the latching position of the latching device the head 68 of the pivot pin 66 abuts one of the pendulum levers substantially midway between its ends and is offset from the line connecting the axes of the pivot pins 64 and 67.

The safety float 54 has secured thereto the lever 69 which is fixed to the bushing 70 journalled on the pivot pin 56 and terminates in the downwardly inclined portion 71 engageable with the head 72 of the pivot pin 67 and adapted to swing the pivot pin 67 and as a result the lower ends of the pendulum levers 62 and the lower ends of the furcations of the bifurcated link 65 in a direction to locate the axis of the pivot pin 66 at the opposite side of the line connecting the axes of the pivot pins 64 and 67 to release the latching device and allow the coil spring 60 to swing the impact lever 52 about its pivot 55 and thereby hit the upper end of the valve and move this valve to closed position when a predetermined abnormal level of the liquid in the chamber of the casing is reached.

To reset the latching device 53, the outer exposed end of the impact lever 52 is lowered and the other end of the lever is raised against the effort exerted by the compression spring 60 to a position allowing the pendulum levers 62 to swing downwardly by gravity to locate the pivot pin 66 at the latching side of the line connecting the axes of the pivot pins 64 and 67, after which the outer exposed end of the impact lever may be released.

What I claim as my invention is:

1. A liquid level controlling device comprising a casing having a chamber, a liquid inlet to said chamber and a liquid outlet from said chamber, a valve for closing said inlet, a float within said chamber operatively connected to said valve for normally moving said valve to closed position when the level of the liquid in said chamber reaches a predetermined normal height, a lever adapted to swing from inoperative position clearing said valve to operative position engaging said valve, a spring operatively connected to said lever to swing the same from inoperative position to operative position and thereby move said valve to closed position, an over-center latching device comprising a member pivotally connected to said lever and a member pivotally connected to said casing and normally operatively connected to said first mentioned member for normally holding said lever in inoperative position and a second float within said chamber and operatively connected to said latching device to move the same to releasing position when the level of the liquid in said chamber reaches a predetermined abnormal height.

2. A liquid level controlling device comprising a casing having a chamber, a liquid inlet to said chamber and a liquid outlet from said chamber, a valve for closing said inlet, a float within said chamber operatively connected to said valve for normally moving said valve to closed position when the level of the liquid in said chamber reaches a predetermined normal height, a spring pressed member for moving said valve to closed position, an over-center latching device comprising a first member pivotally connected to said spring pressed member and a second member pivotally connected to said casing and normally operatively connected to said first member for normally holding said member from movement and a second float within said chamber for moving said latching device to releasing position when the level of the liquid in said chamber reaches a predetermined abnormal height.

3. A liquid level controlling device comprising a casing having a chamber, a liquid inlet to said chamber and a liquid outlet from said chamber, a valve for closing said inlet, a float within said chamber operatively connected to said valve for normally moving said valve to closed position when the level of the liquid in said chamber reaches a predetermined normal height, a member movable from inoperative position clearing said valve to operative position moving said valve to closed position, means for urging said member to operative position, a latching device comprising cooperating pivotal members for normally holding said first mentioned member in inoperative position, a second float within said chamber for moving said latching device to releasing position when the level of the liquid in said chamber reaches a predetermined abnormal height, and a common pivot for said floats.

4. A liquid level controlling device comprising a casing having a chamber, a liquid inlet to said chamber and a liquid outlet from said chamber, a valve for closing said inlet, a float within said chamber operatively connected to said valve for moving said valve to closed position when the level of the liquid in said chamber reaches a predetermined normal height, a lever movable from inoperative position clearing said valve to operative position moving said valve to closed position, means for urging said lever to operative position, an over-center latching device for normally holding said lever in inoperative position comprising a pendulum, and a latch pivotally mounted on said lever, said pendulum and latch having interengaging portions located in the operative position of said latching device beyond the line connecting the axes of the pivots of said pendulum and latch and a second float within said chamber and operatively connected to said pendulum to move said latching device to releasing position when the level of the liquid within said chamber reaches a predetermined abnormal height.

5. A liquid level controlling device comprising a casing having a chamber, a liquid inlet to said chamber and a liquid outlet from said chamber, a valve for closing said inlet, a float within said chamber operatively connected to said valve for moving said valve to closed position when the level of the liquid in said chamber reaches a predetermined normal height, a lever movable from inoperative position clearing said valve to operative position moving said valve to closed position, means for urging said lever to operative position, an over-center latching device for normally holding said lever in inoperative position comprising a pendulum, and a latch pivotally mounted on said lever, said pendulum and latch having interengaging portions located in the operative position of said latching device beyond the line connecting the axes of the pivots of said pendulum and latch, a second float within said chamber and operatively connected to said pendulum to move said latching device to releasing position when the level of the liquid within said chamber reaches a predetermined abnormal height, and a second lever pivotally mounted on said first mentioned lever and operable from outside the casing for swinging said latch to move said latching device to releasing position and for also moving said first mentioned lever to inoperative position.

6. A liquid level controlling device comprising a casing having a chamber, a liquid inlet to said chamber and a liquid outlet from said chamber, a valve for closing said inlet, a pivot pin on said casing, a float journalled on said pivot pin and operatively connected to said valve for normally moving said valve to closed position when the level of the liquid in said chamber reaches a predetermined normal height, a member movable from inoperative position clearing said valve to operative position moving said valve to closed position, means for normally holding said member in inoperative position comprising a pendulum journalled on said pivot pin and a second float journalled on said pivot pin for moving said pendulum to a position releasing said means when the level of the liquid in said chamber reaches a predetermined abnormal height.

7. A liquid level controlling device comprising a casing having a chamber, a liquid inlet to said chamber and a liquid outlet from said chamber, a valve for closing said inlet, a float within said chamber operatively connected to said valve for normally moving said valve to closed position when the level of the liquid in said chamber reaches a predetermined normal height, a lever movable from inoperative position clearing said valve to operative position engaging said valve, a spring operatively connected to said lever to swing the same from inoperative position to operative position and thereby move said valve to closed position, an over-center latching device within said chamber for normally holding said lever in inoperative position, said latching device comprising a pendulum pivotally connected to said casing, a link pivotally connected to said lever below the pendulum pivot and also operatively connected to said pendulum below said link pivot and a second float within said chamber and operatively connected to the lower end portion of said latching device to move the same to position releasing said latching device when the level of the liquid in said chamber reaches a predetermined abnormal height.

8. A liquid level controlling device comprising a casing having a chamber, a liquid inlet to said chamber and a liquid outlet from said chamber, a valve for closing said inlet, a pivot pin on said casing, a float within said chamber journalled on said pivot pin and operatively connected to said valve for moving said valve to closed position when the level of the liquid in said chamber reaches a predetermined normal height, a lever movable from inoperative position clearing said valve to operative position moving said valve to closed position, a latching device within said chamber for normally holding said lever in inoperative position comprising a second lever pivotally connected to said casing, a link pivotally connected to said first mentioned lever and also operatively connected to said second lever at its free end, and a second float within said chamber journalled on said pivot pin and operatively connected to said latching device to move the same to position releasing said latching device when the level of the liquid in said chamber reaches a predetermined abnormal height.

9. A liquid level controlling device comprising a casing having a chamber, a liquid inlet to said chamber and a liquid outlet from said chamber, a valve for closing said inlet, a float within said chamber operatively connected to said valve for normally moving said valve to closed position when the level of the liquid in said chamber reaches a predetermined normal height, a lever movable from inoperative position clearing said valve to operative position moving said valve to closed position, a latching device within said chamber for normally holding said lever in inoperative position, said latching device comprising a second lever pivotally connected to said casing, a link pivotally connected to said second lever and also pivotally connected to said first mentioned lever intermediate the pivotal connection of said second lever to said casing and the pivotal connection of said second lever to said link, and a second float within said chamber and operatively connected to said latching device adjacent the pivotal connection between said second lever and link to move said latching device to position releasing said latching device when the level of the liquid in said chamber reaches a predetermined abnormal height.

ANDREW P. RITTER.

REFERENCES CITED

The following references are of record in the file of this patent:

UNITED STATES PATENTS

| Number | Name | Date |
|---|---|---|
| 2,060,300 | Goldberg | Nov. 10, 1936 |
| 2,067,836 | Foulds | Jan. 12, 1937 |
| 2,090,695 | Miller | Aug. 24, 1937 |
| 2,111,744 | Bock | Mar. 22, 1938 |
| 2,133,226 | Hann | Oct. 11, 1938 |
| 2,139,616 | Foulds | Dec. 6, 1938 |
| 2,189,662 | Foulds | Feb. 6, 1940 |
| 2,209,473 | Price | July 30, 1940 |
| 2,388,793 | McCarty | Nov. 13, 1945 |